US012753961B2

(12) United States Patent
Aoun et al.

(10) Patent No.: US 12,753,961 B2
(45) Date of Patent: Oct. 6, 2026

(54) COOLING CIRCUIT FOR A SYSTEM FOR SUPPLYING AND COOLING A GAS

(71) Applicant: GAZTRANSPORT ET TECHNIGAZ, Saint Remy les Chevreuse (FR)

(72) Inventors: Bernard Aoun, Saint Remy les Chevreuse (FR); Pavel Borisevich, Saint Remy les Chevreuse (FR); Charbel Homsy, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 190 days.

(21) Appl. No.: 18/717,718

(22) PCT Filed: Nov. 25, 2022

(86) PCT No.: PCT/FR2022/052182

§ 371 (c)(1),
(2) Date: Jun. 7, 2024

(87) PCT Pub. No.: WO2023/111414

PCT Pub. Date: Jun. 22, 2023

(65) Prior Publication Data

US 2025/0052463 A1 Feb. 13, 2025

(30) Foreign Application Priority Data

Dec. 14, 2021 (FR) ...................................... 2113467

(51) Int. Cl.
*F25B 49/02* (2006.01)
*F17C 7/02* (2006.01)
*F25B 1/10* (2006.01)

(52) U.S. Cl.
CPC ................ *F25B 49/02* (2013.01); *F17C 7/02* (2013.01); *F25B 1/10* (2013.01);
(Continued)

(58) Field of Classification Search
CPC .......... F25J 1/0022; F25J 1/0025; F25J 1/005; F25J 1/0072; F25J 1/0092; F25J 1/0212;
(Continued)

(56) References Cited

U.S. PATENT DOCUMENTS 3,109,292 A * 11/1963 Schellenberg ......... F25J 1/0248 261/130
11,874,055 B2 * 1/2024 Davies .................. F25J 1/0085
(Continued)

FOREIGN PATENT DOCUMENTS

JP 2016-128737 A 7/2016
KR 10-2010-0049728 A 5/2010

OTHER PUBLICATIONS

Machine Translation of description of KR 20100049728 (Year: 2010).*

(Continued)

*Primary Examiner* — Filip Zec
(74) *Attorney, Agent, or Firm* — Oblon, McClelland, Maier & Neustadt, L.L.P.

(57) ABSTRACT

A cooling circuit for a system for supplying and cooling a gas in a floating structure having a tank, the cooling circuit having a coolant flowing through it and including a main loop having: —a compression device; —a heat exchanger; —an internal heat exchanger; and —a turbocompressor, the cooling circuit includes a regulating branch connected to the main loop, the regulating branch having a valve that is configured to control the flow of coolant within the regulating branch, the main loop including a pressure sensor, the valve controlling the amount of coolant present in the main loop according to the pressure measured by the pressure sensor.

11 Claims, 4 Drawing Sheets

Figure 1:
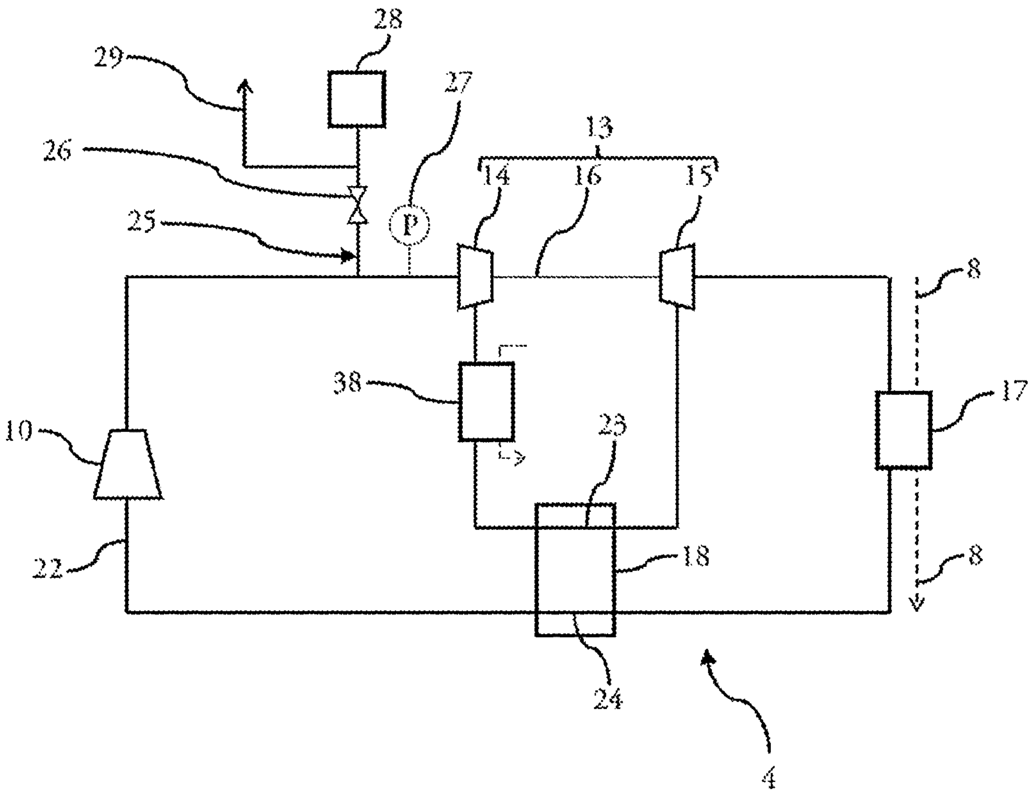

(52) U.S. Cl.
CPC .................... *F17C 2223/013* (2013.01); *F17C 2227/0355* (2013.01); *F17C 2270/0113* (2013.01); *F25B 2500/23* (2013.01); *F25B 2500/24* (2013.01); *F25B 2700/19* (2013.01)

(58) Field of Classification Search
CPC .. F25J 1/023; F25J 1/0249; F25J 1/025; F25J 1/0265; F25J 1/0277; F25J 1/0288; F25J 2235/60; F25J 2245/90; F25J 2290/34; F17C 2223/013; F17C 2227/0355; F17C 2270/0113; F17C 7/02; F25B 1/10; F25B 11/02; F25B 2345/001; F25B 2500/23; F25B 2500/24; F25B 2600/2523; F25B 2700/19; F25B 40/00; F25B 45/00; F25B 49/02
See application file for complete search history.

(56) References Cited

U.S. PATENT DOCUMENTS

| | | | | |
|---|---|---|---|---|
| 12,202,589 | B2 * | 1/2025 | Aoun | B63J 2/14 |
| 2016/0313057 | A1 * | 10/2016 | Roberts | F25J 1/0278 |
| 2018/0245843 | A1 * | 8/2018 | Ragot | F25J 1/0247 |
| 2018/0327056 | A1 * | 11/2018 | Lee | B63B 25/16 |
| 2019/0120548 | A1 * | 4/2019 | Pierre, Jr. | F25J 1/004 |
| 2020/0064060 | A1 * | 2/2020 | Pierre, Jr. | F25B 9/10 |
| 2020/0064062 | A1 | 2/2020 | Liu et al. | |
| 2020/0393196 | A1 * | 12/2020 | Cho | F25J 1/023 |
| 2021/0071815 | A1 * | 3/2021 | Ragot | F17C 13/004 |
| 2021/0164728 | A1 * | 6/2021 | Borisevich | F17C 13/004 |
| 2023/0296294 | A1 * | 9/2023 | Pages | F25J 1/0065 62/115 |

OTHER PUBLICATIONS

International Search Report issued Apr. 6, 2023 in PCT/FR2022/052182, filed on Nov. 25, 2022, 2 pages.

Isalski et al. "On-board reliquefaction for LNG ships", *Proceedings Gas Processors Association. GPA Meeting/ Annualconvention, XX, XX*, May 19, 2005 (May 19, 2005), XP007908438, pp. 1-14.

* cited by examiner

COOLING CIRCUIT FOR A SYSTEM FOR SUPPLYING AND COOLING A GAS

The present invention relates to the field of systems for supplying and cooling a gas within a tank of a floating structure and relates more particularly to a cooling circuit integrated within such system for supplying and cooling a gas.

During the route followed by a floating structure comprising gas in a tank of liquid gas, intended to be delivered to a destination point, said floating structure can be apt to use at least a part of the gas in the liquid state in order to supply at least one of the engines via a gas supply system. In parallel to the above, it is necessary to maintain the pressure within the tank at an acceptable level, in particular by maintaining the cargo of gas in the liquid state at a suitable temperature.

As such, it is known to use a supply circuit allowing evaporating gas to be sucked, then re-compressed to supply the engine or the engines. In a parallel or alternative way, the pressure within the tank can be lowered by means of the cooling circuit allowing a refrigerant fluid to be circulated in order to re-liquefy a fraction of the gas being evaporated within the tank.

In order to implement a cooling of the gas contained in the tank, and thereby to optimally manage the pressure of the tank, the refrigerant fluid has to circulate in the cooling circuit at a defined quantity. Since the refrigerant fluid circulates through different compression or expansion modules, it happens that said fluid leaks through seals or bearings of the modules. The quantity of refrigerant fluid circulating in the cooling circuit could thus decrease over time, until there is not sufficient refrigerant fluid to induce effective cooling of the gas contained in the tank. On the other hand, a too large quantity of refrigerant fluid circulating in the cooling circuit leads to a rise in pressure within the circuit, thus compromising the proper operation thereof.

The present invention allows the quantity of refrigerant fluid present in the cooling circuit to be regulated by proposing a cooling circuit for a system for supplying and cooling a gas from a floating structure comprising at least one tank configured to contain gas in the liquid state, a refrigerant fluid intended to lower the temperature of the gas in the liquid state contained in the tank, flowing through the cooling circuit, the cooling circuit comprising a main loop including:

- at least one compression device providing the compression of the refrigerant fluid,
- at least one heat exchanger configured to perform an exchange of heat between the refrigerant fluid and the gas contained in the tank,
- at least one internal heat exchanger comprising a first passage where the refrigerant fluid circulates at a first pressure and a second passage where the refrigerant fluid circulates at a second pressure lower than the first pressure, the first passage being arranged downstream of the compression device and upstream of the heat exchanger, the second passage being arranged downstream of the heat exchanger and upstream of the compression device,
- at least one turbo-compressor equipped with a compression member arranged between the compression device and the first passage of the internal heat exchanger and a turbine arranged between the first passage of the internal heat exchanger and the heat exchanger, the compression member and the turbine being linked in rotation by a shaft, characterized in that the cooling circuit comprises a regulation branch connected to the main loop, the regulation branch comprising at least one valve configured to control a circulation of refrigerant fluid within the regulation branch, the main loop comprising at least one pressure sensor, the valve controlling the quantity of refrigerant fluid present in the main loop depending on the pressure measured by the pressure sensor.

Due to the regulation branch, the quantity of refrigerant fluid is always controlled in the main loop. The cooling circuit according to the invention allows refrigerant fluid to be added into the main loop if the initial quantity is not sufficient to perform effective cooling, or else to remove the refrigerant fluid, if the refrigerant fluid is present in a too excessive quantity in the main loop. The quantity of refrigerant fluid is determined in real-time by means of the pressure measurement within the main loop by the pressure sensor.

The compression device of the cooling circuit is responsible for making circulate the refrigerant fluid within the main loop. The compression device also allows the refrigerant fluid to be compressed and, as a result, the temperature thereof to be increased. The refrigerant fluid, while circulating, remains permanently in the gaseous state so as not to damage the compression device or the turbo-compressor.

The compression member and the turbine, by the mechanical linkage thereof, are rotated together. The turbine is rotated and thereby rotates the shaft, the shaft as such rotating the compression member. The refrigerant fluid is thus initially compressed by the compression member. The refrigerant fluid then flows through the first passage of the internal heat exchanger and is then expanded by passing through the turbine. The rotation of the turbo-compressor is started by means of a driving member. Such as described hereinabove, the latter can directly rotate the turbine, but said driving member can also directly rotate the compression member.

It should be noted that the shaft only links to turbine to the compression member of the turbo-compressor. The compression device is distinct from the turbo-compressor and hence is not linked to the shaft in any way whatsoever. In other words, the compression device comprises its own driving member and the turbo-compressor comprises its own driving member and the driving members are separated from each other. Such a configuration allows the compression device and the turbo-compressor to have speed independent of one another. It is thereby possible to regulate the flow rate of refrigerant fluid via the compression device independently of the pressure applied to the refrigerant fluid by the compression member.

When expanded, the refrigerant fluid is thus at low pressure and at low temperature at the outlet of the turbine and then passes through the heat exchanger. The gas coming from the tank also flows through the heat exchanger. The latter being at a higher temperature than the temperature of the refrigerant fluid, the gas coming from the tank is thus cooled by the refrigerant fluid. The heat exchanger is thus used e.g. for lowering the temperature of the gas in the liquid state in the tank so as to prevent an overpressure within the tank.

At the outlet of the heat exchanger, the refrigerant fluid circulates within the second passage of the internal heat exchanger. The latter thus provides an exchange of heat between the refrigerant fluid at a first pressure in the first passage and the refrigerant fluid at a second pressure circulating in the second passage. The heat exchange is thus intrinsic to the main loop and allows thermodynamic equilibrium to be managed within the main loop.

The regulation branch comprises an end connected to the main loop so as to ensure a fluidic connection with same. The regulation branch can e.g. extend as far as a refrigerant fluid tank and/or an outlet to the atmosphere. When it is necessary to increase or decrease the quantity of refrigerant fluid within the main loop, the valve opens in order to make the refrigerant fluid circulate from the refrigerant fluid tank to the main loop or from the main loop to the refrigerant fluid tank or to the atmosphere. The valve is in the closed position when the quantity of refrigerant fluid in the main loop is acceptable for meeting the needs of cooling the gas contained in the tank.

The pressure sensor is preferentially configured to measure the refrigerant fluid pressure within the main loop so as to deduce the quantity of refrigerant fluid. A too high pressure is an indication of a too large quantity of refrigerant fluid within the main loop. On the other hand, a too low pressure is an indication of a too little quantity of refrigerant fluid within the main loop.

According to a feature of the invention, the valve is configured to authorize the outlet of refrigerant fluid from the main loop via the regulation branch when the pressure measured by the pressure sensor is greater than a first pressure threshold. The first pressure threshold corresponds to a maximum pressure value beyond which the cooling circuit does not function optimally. When the first pressure threshold is exceeded, the valve opens in order that a quantity of refrigerant fluid circulates outside the main loop via the regulation branch and is either sent to the atmosphere or to the refrigerant fluid tank to be stored therein. The opening of the valve can e.g. result in the reception of a signal emitted by the pressure sensor following the exceeding of the first pressure threshold.

Once the pressure measured for the refrigerant fluid falls again under the first pressure threshold, the refrigerant fluid circuit again functions optimally. The valve is then closed again so as to prevent more refrigerant fluid from leaving the main loop.

According to a feature of the invention, the valve is configured to authorize the inlet of refrigerant fluid into the main loop via the regulation branch when the pressure measured by the pressure sensor is less than a second pressure threshold, the second pressure threshold being lower than the first pressure threshold. The second pressure threshold corresponds to a minimum pressure under which the cooling circuit does no longer function optimally. A too low pressure is an indication of that there is not sufficient refrigerant fluid to meet the cooling needs of the gas contained in the tank. Such lack of refrigerant fluid can e.g. be the result of a leak of refrigerant fluid through the seals of the compression device, of the turbo-compressor or of the turbine. The pressure sensor can then send a signal to the valve of the regulation branch so that said valve opens in order to allow a quantity of refrigerant fluid to be added into the main loop. The refrigerant fluid stored in the refrigerant fluid tank then circulates within the regulation branch in order to reach the main loop.

Once the pressure measured for the refrigerant fluid rises again above the second pressure threshold, the refrigerant fluid circuit again functions optimally. The valve is then closed again so as to prevent more refrigerant fluid into the main loop.

According to a feature of the invention, the regulation branch is connected to the main loop downstream of the compression device and upstream of the compression member of the turbo-compressor, the pressure sensor being configured to measure the pressure within the main loop between the compression device and the compression member of the turbo-compressor. Preferentially, the measurement of the pressure is performed on the same section of the main loop as the fluidic connection between the main loop and the regulation branch.

At the section between the compression device and the compression member, the refrigerant fluid circulating at high pressure, which facilitates the outlet of the refrigerant fluid outside the main loop. The inlet of the refrigerant fluid is however also possible. According to a feature of the invention, the regulation branch is connected to the main loop downstream of the second passage of the internal heat exchanger and upstream of the compression device, the pressure sensor being configured to measure the pressure within the main loop between the second passage of the internal heat exchanger and the compression device. Within the section between the second passage of the internal heat exchanger and the compression device, the refrigerant fluid circulates at low pressure as said section is situated downstream of the turbo-compressor and upstream of the compression device. The circulation of the refrigerant fluid at low pressure favors the inlet of more refrigerant fluid into the main loop but the outlet of refrigerant fluid therefrom is also possible.

According to a feature of the invention, the regulation branch is a first regulation branch connected to the main loop downstream of the compression device and upstream of the compression member of the turbo-compressor, the cooling circuit comprising a second regulation branch connected to the main loop downstream of the second passage of the internal heat exchanger and upstream of the compression device, the main loop comprising a first pressure sensor configured to measure the pressure within the main loop between the compression device and the compression member of the turbo-compressor and a second pressure sensor configured to measure the pressure within the main loop between the second passage of the internal heat exchanger and the compression device.

In other words, two different sections of the main loop of the cooling circuit each comprises a regulation branch. The cooling circuit can thereby be configured to comprise a regulation branch dedicated to the inlet of refrigerant fluid and a regulation branch dedicated to the outlet of refrigerant fluid. Each of the two regulation branches also controls the inlet and outlet of the refrigerant fluid within and outside of, respectively, the main loop. The cooling circuit can also comprise two pressure sensors, each being configured for measuring the pressure of the refrigerant fluid at a section of the main loop where each of the regulation branches are connected. The presence of two pressure sensors also allows two checks to be made in order to determine if one of the pressure thresholds has been crossed.

According to a feature of the invention, the first regulation branch controls an outlet of the refrigerant fluid out of the main loop and the second regulation branch controls the inlet of the refrigerant fluid into the main loop. The first regulation branch is arranged in a high-pressure section of the main loop whereas the second regulation branch is arranged in a second low pressure section of the main loop. In terms of pressure differential, it is easier to control the outlet of refrigerant fluid in a high-pressure section of the main loop and the inlet of refrigerant fluid into a low-pressure section of the main loop.

According to a feature of the invention, the first regulation branch controls an inlet of the refrigerant fluid into the main loop and the second regulation branch controls the outlet of the refrigerant fluid out of the main loop. Indeed, it is possible to invert the inlet and outlet of refrigerant fluid independently of the pressure differential, if the need is felt, e.g. for reasons of layout of the refrigerant fluid tank and/or the outlet to the atmosphere.

According to a feature of the invention, the cooling circuit comprises an additional exchanger, arranged between the compression member of the turbo-compressor and the first passage of the internal heat exchanger, the additional heat exchanger being configured for cooling the refrigerant fluid. The cooling of the refrigerant fluid provides a better expansion of same by the turbine and thereby aims to improve the performances of the cooling of the gas contained in the tank. The refrigerant fluid being at high pressure and at high temperature before passing through the additional heat exchanger, the cooling of the refrigerant fluid within same can be done with a third fluid such as sea water.

According to a feature of the invention, the refrigerant fluid can be nitrogen. Nitrogen is regularly used as refrigerant fluid and is compatible with the cooling circuit according to the invention. Moreover, nitrogen is an easily accessible fluid in the case where the floating structure is a ship provided with nitrogen generators. It is then easier and less costly to establish a connection between the nitrogen generators and one or a plurality of regulation branches of the cooling circuit.

The invention also covers a system for supplying and cooling a gas of a floating structure comprising at least one tank configured for containing the gas in the liquid state, a supply circuit intended for having a gas coming from the tank flowing therethrough and configured for supplying gas to at least one gas consuming apparatus that equips the floating structure, characterized in that the system for supplying and cooling a gas comprises a cooling circuit as described hereinabove.

During the transport of a cargo of gas in liquid form, the latter can partially vaporize within the tank, either naturally or induced so as to supply the gas consuming apparatus. In order to lower the internal pressure of the tank, the gas in the vapor state can either be discharged via a supply circuit, or re-condensed indirectly via the cooling circuit, such as describe hereinabove. The gas consuming apparatus, linked to the tank by the supply circuit can e.g. be an engine providing the propulsion of the floating structure or a generator supplying the floating structure with electrical energy.

Figure 2:
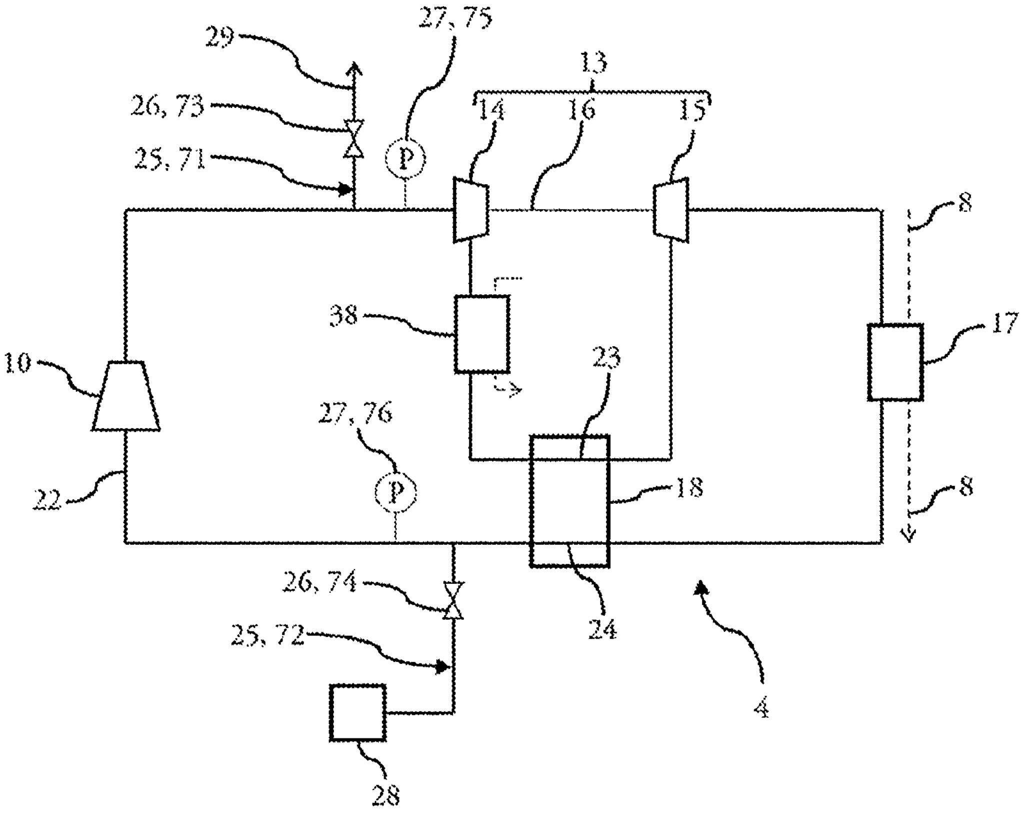
Figure 3:
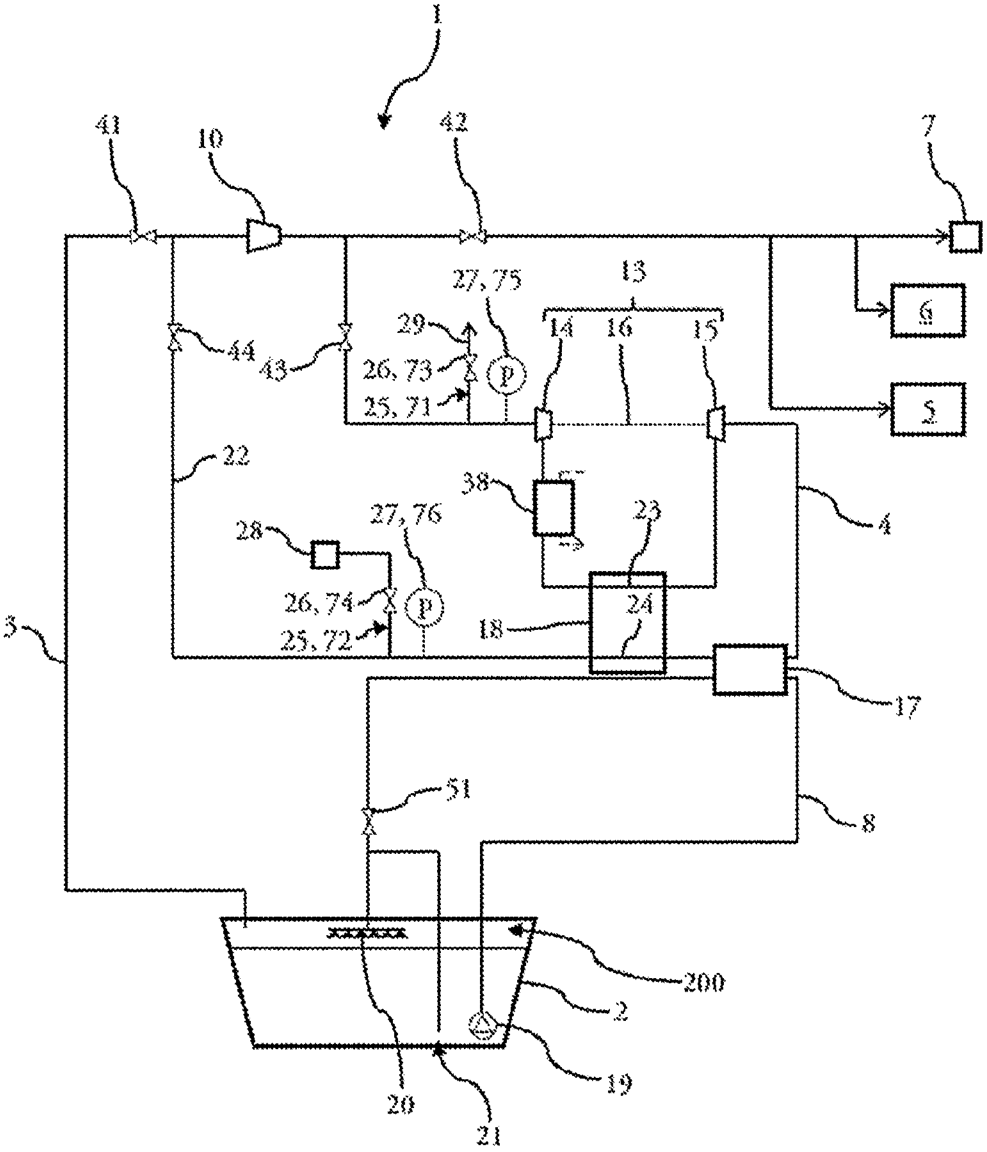
Figure 4:
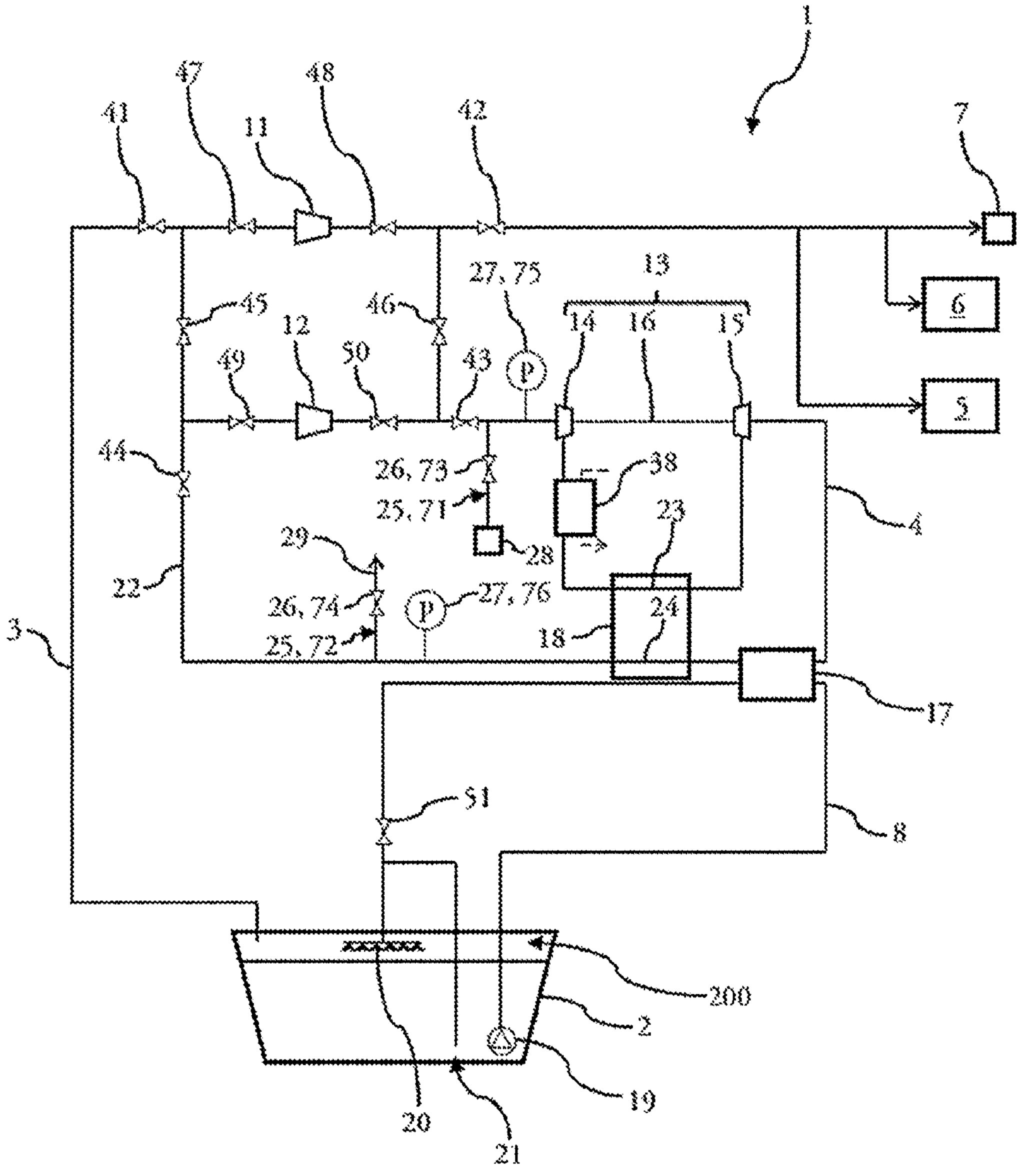

Other features and advantages of the invention will appear again via the following description on the one hand and, on the other hand, a plurality of examples of embodiment, given as an indication, but not limited to, in reference to the schematic drawings given in annex, wherein:

FIG. 1 represents a cooling circuit according to the invention comprising a regulation branch for a refrigerant fluid circulating in said cooling circuit, FIG. 2 represents the cooling circuit according to the invention comprising two regulation branches, FIG. 3 represents a first embodiment of a system for supplying and cooling a gas comprising a cooling circuit, FIG. 4 represents a second embodiment of a system for supplying and cooling a gas comprising a cooling.

FIG. 1 represents a cooling circuit 4 which can be integrated into a system for supplying and cooling a gas of a floating structure transporting and/or storing gas in the liquid state and comprising a tank containing said gas, the tank not being shown herein.

The cooling circuit 4 comprises a main loop 22 within which a refrigerant fluid e.g. nitrogen circulates. The main loop 22 comprises a compression device 10, a turbo-compressor 13, an internal heat exchanger 18, a heat exchanger 17 and an additional exchanger 38. The purpose of the cooling circuit 4 is to circulate the refrigerant fluid within the main loop 22 so that the refrigerant fluid passes through the heat exchanger 17 at low temperature. Gas in the liquid state also flows through the heat exchanger 17 within a circuit of gas in the liquid state 8 partially represented in FIG. 1. As will be described in detail thereafter, the circuit of gas in the liquid state 8 allows gas in the liquid state to circulate, coming from the tank and going to the heat exchanger 17. The gas in the liquid state then returns into the tank after having flowed through said heat exchanger 17. The refrigerant fluid thereby cools the gas coming from the tank, within the heat exchanger 17. The gas in the liquid state, pumped into the tank is thus cooled further by the refrigerant fluid in the heat exchanger 17 then is sent into the tank in order to lower the average temperature of the tank and thereby allow the evaporated gas to condense and the internal pressure of the tank to be managed.

The purpose of the compression device 10 is to circulate the refrigerant fluid and to compress the refrigerant fluid to high pressure and high temperature. The fluid then circulates as far as the turbo-compressor 13. The turbo-compressor 13 comprises a compression member 14 and a turbine 15 mechanically linked to each other via a shaft 16. The shaft only links the compression member 14 to the turbine 15, the compression member 10 as such not being linked to the shaft 16. Such configuration thereby allows the compression device 10 and the compression member 14 to be rotated at a rotation speed different from each other.

The compression member 14 is arranged upstream of a first passage 23 of the internal heat exchanger 18 whereas the turbine 15 is arranged downstream of the first pass 23 of the heat exchanger 18. According to the example shown in FIG. 1, the turbine 15 is rotated by a driving member and thereby drives the shaft 16 that as such drives the compression member 14. According to another example, the driving member can rotate the compression member 14 which thereby drives the shaft 16 which as such drives the turbine 15. The additional exchanger 38, is as such interposed between the compression member 14 and the first passage 23 of the internal heat exchanger 18.

The refrigerant fluid is thus initially compresses by the compression member 14, then flows through the additional exchanger 38 where same is cooled by a third fluid e.g. by sea water. The cooling via the additional exchanger 38 subsequently allows a more efficient expansion by the turbine 15 to occur. The refrigerant fluid then flows through the first passage 23 of the internal heat exchanger 18 and is subsequently expanded by the turbine 15. The expansion produces a decrease in temperature of the refrigerant fluid that circulates through the heat exchanger 17 at low temperature in order to cool the gas in the liquid state coming from the tank, such as described hereinabove.

At the outlet of the heat exchanger 17, the refrigerant fluid then flows through a second passage 24 of the internal heat exchanger 18. An exchange of heat thus takes place between the refrigerant fluid circulating at first pressure within the first passage 23 of the internal heat exchanger 18 and the refrigerant fluid circulating at a second pressure lower than the first pressure, within the second passage 24 of the internal heat exchanger 18, in order to regulate the temperature of the refrigerant fluid circulating in the cooling circuit 4.

During the functioning of the cooling circuit, it is possible that the refrigerant fluid circulating in the main loop 22 is present in too large quantity or in too low quantity, which can hinder the functioning of the cooling circuit 3 and/or the cooling performances thereof. The monitoring of the quantity of refrigerant fluid in the main loop 22 is provided by a pressure sensor 27 arranged in the main loop 22 and measuring the pressure of the refrigerant fluid in real-time. The pressure measured is an indication of the quantity of refrigerant fluid present in the main loop 22, a too high pressure being related to an excess of refrigerant fluid and a too low pressure being related to a too low quantity of refrigerant fluid.

Moreover, in order to adjust the quantity of refrigerant fluid in the main loop 22, the cooling circuit 4 comprises a regulation branch 25 connected to the main loop 22. The regulation branch 25 comprises a valve 26 and extends up to a refrigerant fluid tank 28 and, if appropriate, to an outlet 29 to the atmosphere. In case of a non-conforming quantity of refrigerant fluid for an optimum cooling performance, the valve 26 can be opened to drive the circulation of refrigerant fluid into the regulation branch 25 in order to increase or decrease the quantity of refrigerant fluid in the main loop 22.

If the refrigerant fluid is present in excess in the main loop 22, the valve 26 opens in order that a given quantity of refrigerant fluid leaves the main loop 22 and circulates in the regulation branch 25 as far as the refrigerant fluid tank 28 or to the outlet 29 to atmosphere.

If the refrigerant fluid is present in too low quantity in the main loop 22, e.g. following an excess of refrigerant fluid escaping through the seals of the compression device 10 or of the turbo-compressor 13, the valve 26 opens in order that a given quantity of refrigerant fluid coming from the refrigerant fluid tank 28 circulates in the regulation branch 25 as far as the main loop 22.

In both cases described hereinabove, the valve 26 closes again once the quantity of refrigerant fluid present in the main loop 22 has reached an optimal quantity allowing the performances of the cooling circuit 4 to be maximized.

The opening and the closing of the valve 26 can depend on a signal emitted by the pressure sensor 27. The latter can thereby be configured to detect if the measured pressure of the refrigerant fluid exceeds a first pressure threshold, indicating an excess of refrigerant fluid in the main loop 22, in order to send a signal ensuring the opening of the valve 26 and the outlet of the refrigerant fluid.

The pressure sensor 27 can also detect if the measured pressure of the refrigerant fluid is below a second pressure threshold which is as such lower than the first pressure threshold. In such configuration, the above means that the refrigerant fluid is not present in a sufficient quantity in the main loop 22. The pressure sensor 27 can then send a signal ensuring the opening of the valve 26 and the inlet of the refrigerant fluid into the main loop 22, coming from the refrigerant fluid tank 28.

Preferentially, the regulation branch 25 is connected to the same section as the section where the refrigerant fluid pressure is measured by the pressure sensor 27. In FIG. 1, the pressure sensor 27 and the regulation branch 25 are positioned between the compression device 10 and the compression member 14 of the turbo-compressor 13. The cooling circuit 4 according to the invention thereby allows the quantity of refrigerant fluid circulating in the main loop 22 to be adjusted so as to perform an optimal cooling of the gas contained in the tank by means of the exchange of heat occurring in the heat exchanger 17.

FIG. 2 shows the cooling circuit 4 but with two regulation branches 25. The above is the only structural difference with the cooling circuit 4 shown in FIG. 1. We can thus refer to the description of same concerning all the elements common to the two representations of the cooling circuit 4 according to the invention.

The cooling circuit 4 shown in FIG. 2 thereby comprises a first regulation branch 71 and a second regulation branch 72. Each of the regulation branches 25 comprises its own valve 26, i.e. a first valve 73 positioned on the first regulation branch 71 and a second valve 74 positioned on the second regulation branch 72. The second regulation branch 72 is laid out at a low-pressure section of the main loop 22, more precisely between the second passage 24 of the internal heat exchanger 18 and the compression device 10. The first regulation branch 71 is positioned on the same section as the regulation branch 25 shown in FIG. 1. It should be noted that the cooling circuit 4 only includes one regulation branch 25 which can also be positioned on the section of the main loop 22 where the second regulation branch 72 shown in FIG. 2 is arranged and can alone ensure the inlet and/or outlet of refrigerant fluid into or out of the main loop 22.

The cooling circuit 4 also has two pressure sensors 27, including a first pressure sensor 75 measuring the pressure of the refrigerant fluid between the compression device 10 and the compression member 14 of the turbo-compressor 13, and a second pressure sensor 76 measuring the pressure of the refrigerant fluid between the second passage 24 of the internal heat exchanger 18 and the compression device 10. The fact of having two pressure sensors 27 allows the measurement of the pressure of the refrigerant fluid to be better controlled over time and a check to be made if one of the two pressure thresholds describe hereinabove has been crossed.

In FIG. 2, the first regulation branch 71 extends as far as the outlet 29 to the atmosphere while the second regulation branch 72 extends as far as the refrigerant fluid tank 28. It is thereby understood that the first regulation branch 71 is dedicated to an outlet, if any, of the refrigerant fluid out of the main loop 22 and the second regulation branch 72 is dedicated to an inlet, if any, of the refrigerant fluid into the main 22 loop. Such configuration is advantageous in that it is easier to discharge the refrigerant fluid out of the main loop 22 when the refrigerant fluid is at high pressure. It is also easier to inlet the refrigerant fluid into the main loop 22 when the refrigerant fluid circulating within the main loop is at low pressure. The opening and the closing of the valves 26 functions identically to what was described in FIG. 1, being dependent of the pressure of the refrigerant fluid measured by each of the pressure sensors 27.

FIG. 3 shows a first embodiment of a system for supplying and cooling a gas 1 comprising a cooling circuit 4 described hereinabove. The system for supplying and cooling a gas 1 can be laid out within a floating structure apt to transport and/or store gas in liquid form, e.g. within the tank 2. The gas is e.g. natural gas or ethane. The gas in liquid form is stored in the tank 2 at very low temperature. For various reasons, e.g. naturally during the transport, the gas in liquid form could partially evaporate at the blanket 200 of the tank 2.

The system for supplying and cooling a gas 1 comprises a supply circuit 3. The supply circuit 3 is configured to suction the evaporated gas formed in the blanket 200 of the tank 2. The gas could then be used as fuel for a first gas consuming apparatus 5 and/or a second gas consuming apparatus 6. As an example, the first gas consuming apparatus 5 could be an engine providing the propulsion of the floating structure and the second gas consuming apparatus 6 could be an auxiliary engine responsible for the electrical supply of the floating structure.

In FIG. 3, it is possible to observe that the compression device 10 ensuring the circulation of the refrigerant fluid within the cooling circuit 4 can also be used within the supply circuit 3 for compressing the evaporated gas so as to send the gas to the gas consuming apparatuses. If the latter do not require an input of energy via the gas, the gas could be eliminated e.g. via a burner 7. The compression device 10 could thus be used for one or other of the circuits.

If the refrigerant fluid is nitrogen, same is not compatible for supplying gas consuming apparatuses. In order to prevent deteriorations of the apparatuses while switching the compression device 10 from the cooling circuit 4 to the supply circuit 3, the cooling circuit 4 can be purged in order to completely remove the nitrogen, e.g. by means of the regulation branches 25 before using the compression device 10 for supplying the gas consuming apparatus.

In order to isolate the compression device 10 within the supply circuit 3 or within the cooling circuit 4, the system for supplying and cooling a gas 1 comprises an arrangement of valves. Thereby, a first valve 41 is arranged on the supply circuit 3 upstream of the compression device 10 and of the connection to the cooling circuit 4, a second valve 42 is arranged on the supply circuit 3 downstream of the compression device 10 and of the connection to the cooling circuit 4, a third valve 43 is arranged on the cooling circuit 4 downstream of the compression device 10 and of the connection to the supply circuit 3 and a fourth valve 44 is arranged on the cooling circuit 4 upstream of the compression device 10 and of the connection to the supply circuit 3.

Thereby, when the first valve 41 and the second valve 42 are in the open position and the third valve 43 and the fourth valve 44 are in the closed position, the compression device 10 is integrated into the supply circuit 3 for the purpose of compressing the gas for supplying the gas consuming apparatus.

When the first valve 41 and the second valve 42 are in the closed position and the third valve 43 and the fourth valve 44 are in the open position, the compression device 10 is integrated into the cooling circuit 4 for the purpose of compressing the refrigerant fluid for cooling the gas contained in the tank 2.

The system for supplying and cooling a gas 1 also comprises the circuit for the gas in the liquid state 8 mentioned hereinabove, within which the gas in the liquid state coming from tank 2 and flowing through the heat exchanger 17, circulates. The circuit for the gas in the liquid state 8 allows the gas being evaporated into the blanket 200 of the tank 2 to be condensed and thereby participates in the management of the tank pressure.

The gas in the liquid state of the tank 2 is suctioned into the circuit for the gas in the liquid state 8 by means of a pump 19. The gas in the liquid state then circulates until flowing through the heat exchanger 17. It is thereby understood that the exchange of heat occurring within the heat exchanger 17 takes place between the refrigerant fluid circulating in the cooling circuit 4 and the gas in the liquid state circulating in the circuit for the gas in the liquid state 8. The gas in the liquid state thereby cooled leaves the heat exchanger 17.

After having been cooled, the gas in the liquid state can return to the lower part of the tank 2 via an outlet orifice 21. Such an operation participates in lowering the average temperature of the tank 2, which leads to a lowering of the saturation pressure of the tank 2 and thereby a lowering of the pressure in the tank 2.

The cooled gas in the liquid state can also be sprayed in the form of a spray into the blanket 200 of the tank 2. To this end, the circuit for the gas in the liquid state comprises a spraying member 20 ensuring the spraying of the gas in the liquid state. The spraying of the gas in the liquid state allows the gas being evaporated into the blanket 200 of the tank 2, to condense. The condensation of the gas thereby decreases the quantity of evaporated gas which hence leads to a decrease in the internal pressure of the tank 2. In order whether or not to authorize the circulation of the gas in the liquid state, the circuit for the gas in the liquid state 8 comprises an additional valve 51.

The cooling circuit 4, more particularly the regulation branches 25 of same, is structurally and functionally identical to what has been described in FIGS. 1 and 2. One will thus refer to the description of the Figures for the functioning of the regulation branches 25.

FIG. 4 shows a second embodiment of a system for supplying and cooling a gas 1. The second embodiment is distinguished from the first embodiment in that same comprises a first compression device 11 and a second compression device 12. The first compression device 11 is installed in the supply circuit 3 whereas the second compression device 12 is installed within the cooling circuit 4. However, the function of the two compression devices is not defined by the location of the systems such as will be described in detail thereafter.

Moreover, the presence of two compression devices makes it possible to install a redundancy within the system for supplying and cooling a gas 1. Thereby, e.g., if one of the compression devices fails, the other compression device can still ensure the function thereof and keep the system for supplying and cooling a gas 1 operational.

The supply circuit 3 and the cooling circuit 4 both comprise a plurality of valves providing access to each of the compression devices so that the systems can both meet the need of gas supply to the gas consuming apparatus or the needs of supply of the refrigerant fluid of the cooling circuit. Thereby, in addition to the four valves already found in the first embodiment, the second embodiment of the system for supplying and cooling a gas 1 comprises a fifth valve 45, a sixth valve 46, a seventh valve 47, an eighth valve 48, a ninth valve 49 and a tenth valve 50.

The fifth valve 45 and the sixth valve 46 allow a connection to be made from the first compression device 11 to the cooling circuit 4 or else a connection from the second compression device 12 to the supply circuit 3, depending on the configuration of the system for supplying and cooling a gas 1.

The seventh valve 47 and the eight valve 48 are installed on either side of the first compression device 11 and allow the system to be isolated when the valves are in the closed position. The closing of the valves is useful in case of failure of the first compression device 11. The ninth valve 49 and the tenth valve 50 will allow same to be used to isolate the second compression device 12 from the rest of the system for supplying and cooling a gas 1.

All of the valves thereby allow a compression device to be dedicated to each of the circuits or else to dedicate both compression devices to the supply circuit 3 or to the cooling circuit 4. The fact of dedicating a compression device to each of the circuits allows for the simultaneous operation of the supply circuit 3 for supplying the gas to the gas consuming apparatus and to the cooling circuit 4 in order to cool the gas contained in the tank 2 using the refrigerant fluid. When both compression devices are dedicated to only one or other of the circuits, only one of the abovementioned functions is provided.

Like for the first embodiment, with the assumption of the refrigerant fluid being nitrogen, and in order to prevent deterioration of the gas consuming apparatus while switching the compression device 11 and/or the second compression device 12 from the cooling circuit 4 to the supply circuit 3, the cooling circuit 4 can be purged in order to completely remove the nitrogen, e.g. by means of the regulation branches 25 before using the compression device(s) for supplying the gas consuming apparatus.

The second embodiment is also distinguished from the first embodiment in that the first regulation branch 71 is linked to the refrigerant fluid tank 28 and in that the second regulation branch 72 is linked to the outlet 29 to the atmosphere. Such configuration can be implemented e.g. for the reasons of mechanical dimensions or stresses in the piping connections.

The rest of the system for supplying and cooling a gas 1 is structurally and/or functionally identical to what was described hereinabove or one will refer to the descriptions of FIG. 3 concerning the structural and functional details of the system for supplying and cooling a gas 1 and to the descriptions of FIGS. 1 and 2 concerning the structural and functional details of the cooling circuit 4.

Of course, the invention is not limited to the examples that have just been described and many adaptations can be made to said examples without departing from the scope of the invention.

The invention such has been just described, achieves indeed the goal set for same and allows a cooling circuit to be proposed that is apt to regulate a quantity of refrigerant fluid within the cooling circuit in order to optimize the cooling performances of a gas contained in the tank of the floating structure. Variants not described herein could be implemented without departing from the scope of the invention, as long as, according to the invention, the variants comprise a cooling circuit according to the invention.

The invention claimed is:

1. A cooling circuit for a system for supplying and cooling a gas of a gas of a floating structure comprising at least one tank configured to contain gas in the liquid state, a refrigerant fluid intended to lower the temperature of the gas in the liquid state contained in the tank flowing through the cooling circuit, the cooling circuit comprising a main loop comprising:

at least one compression device providing the compression of the refrigerant fluid;

at least one heat exchanger configured to make an exchange of heat between the refrigerant fluid and the gas contained in the tank;

at least one internal heat exchanger comprising a first passage where the refrigerant fluid circulates at a first pressure and a second passage where the refrigerant fluid circulates at a second pressure lower than the first pressure, the first passage being arranged downstream of the compression device and upstream of the heat exchanger, the second passage being arranged downstream of the heat exchanger and upstream of the compression device; and at least one turbo-compressor equipped with a compression member arranged between the compression device and the first passage of the internal heat exchanger and a turbine arranged between the first passage of the internal heat exchanger and the heat-exchanger, the compression member and the turbine being linked in rotation by a shaft, wherein the cooling circuit comprises a regulation branch connected to the main loop, said regulation branch comprising at least one valve configured for controlling the circulation of a refrigerant fluid within the regulation branch, the main loop comprising at least one pressure sensor, the valve controlling a quantity of refrigerant fluid present in the main loop depending on the pressure measured by the pressure sensor, the shaft only linking the turbine to the compression member of the turbo-compressor, the compression device being distinct from the turbo-compressor and being not linked to the shaft.

2. The cooling circuit according to claim 1, wherein the valve is configured to authorize the outlet of refrigerant fluid from the main loop via the regulation branch when the pressure measured by the pressure sensor is greater than a first pressure threshold.

3. The cooling circuit according to claim 2, wherein the valve is configured to authorize the inlet of refrigerant fluid into the main loop via the regulation branch when the pressure measured by the pressure sensor is less than a second pressure threshold, the second pressure threshold being lower than the first pressure threshold.

4. The cooling circuit according to claim 1, wherein the regulation branch is connected to the main loop downstream of the compression device and upstream of the compression member of the turbo-compressor, the pressure sensor being configured to measure the pressure within the main loop between the compression device and the compression member of the turbo-compressor.

5. The cooling circuit according to claim 1, wherein the regulation branch is connected to the main loop downstream of the second passage of the internal heat exchanger and upstream of the compression device, the pressure sensor being configured to measure the pressure within the main loop between the second passage of the internal heat exchanger and the compression device.

6. The cooling circuit according to claim 1, wherein the regulation branch is a first regulation branch connected to the main loop downstream of the compression device and upstream of the compression member of the turbo-compressor, the cooling circuit comprising a second regulation branch connected to the main loop downstream of the second passage of the internal heat exchanger and upstream of the compression device, the main loop comprising a two pressure sensors of which a first pressure sensor configured for measuring the pressure within the main loop between the compression device and the compression member of the turbo-compressor and a second pressure sensor configured to measure the pressure within the main loop between the second passage of the internal heat exchanger and the compression device.

7. The cooling circuit according to claim 6, wherein the first regulation branch controls an outlet of the refrigerant fluid out of the main loop and the second regulation branch controls the inlet of the refrigerant fluid into the main loop.

8. The cooling circuit according to claim 6, wherein the first regulation branch controls an inlet of the refrigerant fluid into the main loop and the second regulation branch controls the outlet of the refrigerant fluid out of the main loop.

9. The cooling circuit according to claim 1, comprising an additional exchanger, arranged between the compression member of the turbo-compressor and the first passage of the internal heat exchanger, the additional exchanger being configured for cooling the refrigerant fluid.

10. The cooling circuit according to claim 1, wherein the refrigerant fluid is nitrogen.

11. A system for supplying and cooling a gas of a floating structure comprising at least one tank configured for containing a gas in the liquid state, a supply circuit intended for gas to flow therethrough, the gas coming from the tank and configured for supplying gas to at least one gas consuming apparatus that equips the floating structure, characterized in that the system for supplying and cooling a gas comprises a cooling circuit according to claim 1.

* * * * *